US005540315A

United States Patent [19]

Haiki et al.

[11] Patent Number: 5,540,315

[45] Date of Patent: Jul. 30, 1996

[54] SERPENTINE-TYPE VENDING RACK FOR A VENDING MACHINE

[75] Inventors: Nobuhiko Haiki; Yoshitada Tamura; Mitsuhiro Saka, all of Mie, Japan

[73] Assignee: Fuji Electric Co., Ltd., Kawasaki, Japan

[21] Appl. No.: 345,397

[22] Filed: Nov. 21, 1994

[30] Foreign Application Priority Data

Nov. 30, 1993 [JP] Japan .................................... 5-299276

[51] Int. Cl.$^{6}$ ............................ B65G 11/18; B65G 11/20

[52] U.S. Cl. ............................ 193/27; 221/281; 221/287; 221/304; 221/312 B; 211/59.2; 312/72

[58] Field of Search .................................... 221/193, 261, 221/266, 281, 287, 304, 312 B, 312 R, 155; 211/59.2, 74; 193/27, 28; 312/35, 45, 60, 72

[56] References Cited

U.S. PATENT DOCUMENTS

| | | | |
|---|---|---|---|
| 4,685,590 | 8/1987 | Negishi et al. | 221/281 X |
| 4,913,313 | 4/1990 | Rockola | 221/281 X |
| 5,009,329 | 4/1991 | Farrentine | 221/45 X |
| 5,305,913 | 4/1994 | Shade | 221/155 X |

FOREIGN PATENT DOCUMENTS

| | | | |
|---|---|---|---|
| 1253092 | 10/1989 | Japan | 221/281 X |
| 2224197 | 9/1990 | Japan | 221/281 X |
| 589350 | 4/1993 | Japan | 221/312 R X |
| 62-66945 | 9/1994 | Japan | 221/193 X |

*Primary Examiner*—William E. Terrell
*Assistant Examiner*—Dean A. Reichard
*Attorney, Agent, or Firm*—Kanesaka & Takeuchi

[57] ABSTRACT

A vending rack for a vending machine is formed of a housing, a path for a merchandise defined in the housing and having an inlet side and an outlet side, an inlet regulating device situated at the inlet side of the path for regulating a size of the merchandise to be supplied to the path, a vending mechanism situated near the outlet side of the path, and an outlet regulating plate situated at the outlet side of the path. The position of the outlet regulating plate is adjusted according to the size of the merchandise. A connecting rod is situated between the inlet regulating device and the outlet regulating plate. The connecting rod is movably attached to the housing so that when one of the inlet regulating device and the outlet regulating plate is moved to adjust the size of the merchandise, the other of the inlet regulating device and the outlet regulating plate is moved to thereby adjust the inlet regulating device and the outlet regulating plate in one adjustment.

7 Claims, 4 Drawing Sheets

SERPENTINE-TYPE VENDING RACK FOR A VENDING MACHINE

BACKGROUND OF THE INVENTION AND RELATED ART STATEMENT

The invention relates to a structure of a serpentine-type vending rack mounted on a vending machine for selling canned goods or merchandise.

The serpentine-type vending rack has been well known, such as U.S. Pat. No. 4,498,569, and a conventional structure thereof is shown in FIGS. 4(*a*) to 4(*c*). In the drawings, numeral 1 represents a vending rack, and 2 represents rack side walls. Numeral 3 represents rack segments arranged in front and rear sides for bridging the right and left rack side walls 2, and numeral 4 represents merchandise passages in a serpentine-shape, each being defined between a pair of front and rear rack segments 3. Numeral 5 represents top trays disposed on a side of merchandise supply ports or inlets of an upper part of the rack and connected to the respective merchandise passages 4. Numeral 6 represents swingable merchandise supply guides or flappers in a curved form disposed at inlet corners of the merchandise passages 4 on the back sides of the top trays 5. Numeral 7 represents star-wheel type vending mechanisms, each provided at a side of a merchandise outlet end at a lower side of the rack corresponding to each merchandise passage 4. Numeral 8 represents outlet regulating plates, each being situated opposite to the vending mechanism 7 with an outlet passage 9 therebetween.

Incidentally, the example shown in the drawings is called a double serpentine rack, wherein the merchandise passages 4 are provided in the rack in two rows at front and rear sides, and the two vending mechanisms 7 corresponding to the respective merchandise passages 4 are disposed in the center of the vending rack 1 in a back-to-back arrangement. The outlet regulating plates 8 are provided at the front and rear sides so that the vending mechanisms 7 are disposed therebetween.

The vending operation of the machine with the structure as described above has been known, wherein when merchandises 10 are supplied from a front side of the vending rack 1 onto the top tray 5, the merchandises 10 roll on the top tray 5 from an inlet side to an inside, and hit the merchandise supply guide 6 in the rear end. The merchandises 10 change the direction, and fall down into the merchandise passage 4 so that the merchandises are piled up vertically in a line. The lowest merchandise situated in the outlet passage 9 is held between the star-wheel of the vending mechanism 7 and the outlet regulating plate 8 to thereby remain in a sale waiting position. The lowest merchandise 10 in this state is released and falls down when the vending machine is operated by a sale command. Incidentally, the merchandise sent out from the vending rack 1 is transferred to a merchandise exit port through a chute.

Also, in case the serpentine-type vending rack having the above-mentioned structure is changed to supply the merchandise 10 having a different diameter, i.e. large diameter can or small diameter can, it is especially necessary to adjust a width B of the outlet passage 9 between the vending mechanism 7 and the outlet regulating plate 8, and a space A between a rear end of the top tray 5 and the rack segment 3 so that the width B and the space A coincide with a can diameter d of the merchandise 10. As prior adjusting means for this purpose, the top tray 5 is provided with pins 11 at the front and rear ends, and the pins 11 are fitted in regulating grooves 12 of a reversed U-shape formed on the rack side walls 2, so that the top trays 5 are held to be movable in a lateral, i.e. front and rear, direction. Also, as in the top tray 5, the outlet regulating plate 8 is provided with pins 13 at the upper and lower ends thereof, and the pins 13 are fitted into regulating grooves 14 formed on the rack side walls 2, so that the outlet regulating plate 8 is held to be movable in a lateral direction.

In the vending machine of the prior structure as stated above, when a merchandise is changed to another merchandise with a different size, the adjusting operation of the passage widths at the merchandise supply portion and the merchandise outlet portion has to be separately carried out at the top tray 5 and the outlet regulating plate 8. Therefore, the adjusting operation takes time and labor. Moreover, there may be an error in the adjusting operation such that the passage width on the merchandise supply portion side and the outlet passage width on the merchandise outlet portion side differ from each other relative to the size of the merchandise.

For example, in case a large diameter merchandise (large sized can) is sold, even if the outlet regulating plate 8 is set at a correct position, if the top tray 5 is mistakenly set at a position for a small diameter merchandise (small sized can), the merchandise supplied from the merchandise supply port is stopped at the rear end of the top tray 5 and does not fall down into the merchandise passage 4 to be received therein. On the contrary, if the outlet regulating plate 8 is erroneously set so that the width of the outlet passage 9 is narrower than a diameter of the can, the merchandise is stopped at a point transferring from the merchandise passage 4 to the outlet passage 9. Thus, there may be various problems in conveying the merchandise.

The present invention has been made based on the above problems, and an object of the present invention is to provide a manageable serpentine-type vending rack of a vending machine, wherein the passage widths on a merchandise supply side and a merchandise outlet side can be simultaneously and inter-relatedly adjusted by an adjusting operation from one point.

SUMMARY OF THE INVENTION

In order to attain the above object, according to the present invention, a vending rack is constructed as follows:

In a first embodiment of the invention, a top tray disposed at a side of a merchandise supply port at an upper portion of a rack and an outlet regulating plate disposed opposite to a vending mechanism on a merchandise outlet side at a lower portion of the rack are connected to each other through a connecting rod.

Also, in the embodiment thereof, there is a structure such that the outlet regulating plate opposite to the vending mechanism at a rear portion thereof and the top tray are connected by the connecting rod, and an intermediate portion of the rod is supported by the rack side wall through a support pin and a support groove.

In a second embodiment of the invention, a swingable merchandise supply guide provided behind the top tray and the outlet regulating plate are connected to each other through the connecting rod.

In the embodiment thereof, there is a structure such that on a back side of the merchandise supply guide, a through pin guided and supported to fit in a regulating groove is formed in a vertically oblique direction with respect to the rack side wall, and the through pin is connected to an upper side of the connecting rod. Also, an inspecting window is provided in a plate for the merchandise supply guide for confirming a setting position of the through pin from a front side of the vending rack through a merchandise supply port via a visual inspection.

In the structure of the above-mentioned first embodiment, in case a merchandise is changed to another sized merchandise, e.g. changing a merchandise in a large size to a merchandise in a small size, when either the outlet regulating plate or the top tray is moved to a new fixing position by a hand operation, the movement is transmitted to the other member through the connecting rod, so that the both members are concurrently and inter-relatedly moved to newly fixed positions.

In this case, with respect to the outlet regulating plate opposite to the vending mechanism in the rear side thereof as viewed from the front side of the vending rack, an intermediate portion of the connecting rod provided between the outlet regulating plate and the top tray is supported by the rack side wall through the support pin and support groove, so that movements of the outlet regulating plate and the top tray are reversed around the intermediate supporting pin of the connecting rod. Thus, the setting directions in the passage on the side of the merchandise supply portion and in the outlet passage on the side of the merchandise outlet end coincide with each other.

In the structure of the second embodiment, by moving the outlet regulating plate to a new fixing position by a hand operation, the movement is transmitted to the merchandise supply guide through the connecting rod to thereby set the merchandise supply guide to a new position. With this operation, the width of the supply passage between the rear end of the fixed top tray and the merchandise supply guide and the width of the outlet passage on the vending mechanism side are concurrently and inter-relatedly adjusted.

In this case, the through pin is provided on a rear side of the merchandise supply guide to be guided and supported by a regulating groove provided laterally and obliquely with respect to the rack side wall, and at the same time the through pin is connected to the upper end of the connecting rod. In the structure, the through pin is moved laterally along the regulating groove in the vertically oblique direction in cooperation with a movement of the connecting rod, and at the position, an opening angle of the swingable merchandise supply guide is regulated to coincide with a diameter of a merchandise. Further, by providing an inspecting window for confirming the set position of the through pin via a visual inspection from the front of the vending rack through the merchandise supply port, it is possible to confirm visually the set position of the through pin arranged in the rear side of the merchandise supply guide through the inspection window.

BRIEF DESCRIPTION OF THE DRAWINGS

FIGS. 1(*b*) and 1(*c*) are operation explanatory views for adjusting widths of merchandise passages on the front row and rear row sides in FIG. 1(*a*), respectively;

FIG. 2(*b*) is an operation explanatory view for adjusting a width of the passage in FIG. 2(*a*);

FIGS. 3(*b*) and 3(*c*) are operation explanatory views for adjusting widths corresponding to a large can and a small can, respectively;

FIGS. 4(*b*) and 4(*c*) show structures for fixing a top tray and an outlet regulating plate in FIG. 4(*a*), respectively.

DETAILED DESCRIPTION OF THE PREFERRED EMBODIMENTS

Figure 1A:
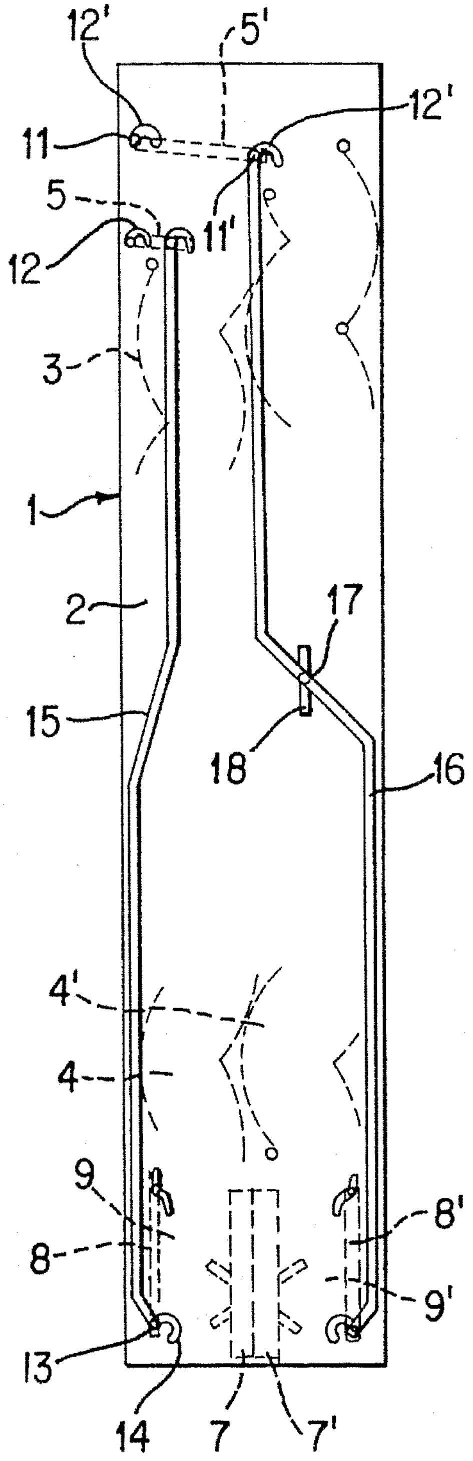
FIG. 1 (*a*) is a side view of a vending rack of a first embodiment.

Hereinunder, embodiments are described with reference to the accompanying drawings. In the drawings, the same members have the same numerals.

Figure 1B:
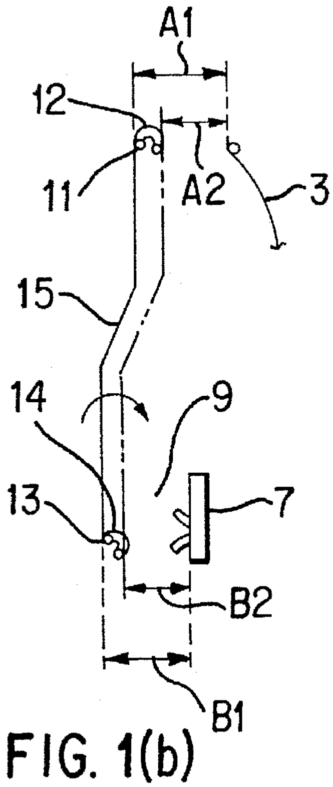
Figure 1C:
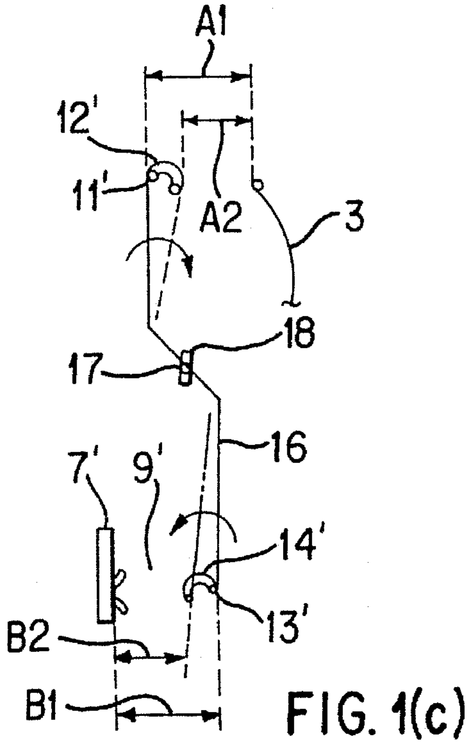

FIGS. 1(*a*) through 1(*c*) show a first embodiment of the invention. In the embodiment, two merchandise passages 4, 4', i.e. front and rear rows, are defined in a vending rack 1. In the passage 4, an outlet regulating plate 8 opposite to a vending mechanism 7 on the front side thereof and a top tray 5 at an upper portion of the rack are connected to each other through a connecting rod 15. The connecting rod 15 is disposed outside a rack side wall 2. On the other hand, in the merchandise passage 4' on the rear row side, an outlet regulating plate 8' opposite to a vending mechanism 7' on the rear side thereof and a top tray 5' at an upper portion of the rack are connected to each other through a connecting rod 16. The connecting rod 16 is located outside the rack side wall 2 as in the connecting rod 15, and a support pin 17 provided at an intermediate portion of the connecting rod 16 is loosely mounted in a vertical support groove 18 formed on the rack side wall 2 so as to guide and support the connecting rod 16.

Incidentally, the top trays 5, 5' and the outlet regulating plates 8, 8' are respectively guided and supported through support pins 11, 11', regulating grooves 12, 12', support pins 13, 13' and regulating grooves 14, 14', so that the top trays 5, 5' and the outlet regulating plates 8, 8' are movable with respect to the rack side wall 2 laterally, i.e. in the front and rear directions.

In the structure as described above, when the outlet regulating plates 8, 8' are moved laterally by hand along the regulating grooves 14, 14', the top trays 5, 5' are laterally moved along the regulating grooves 12, 12' through the connecting rods 15, 16, and the widths of the passages on the side of the merchandise supply portion, i.e. each width of a merchandise supply passage between the rear end of the top tray 5 and a rack segment 3 arranged in the rear side thereof, are changed. More specifically, as shown in FIGS. 1(*b*) and 1(*c*), when the connecting rods 15, 16 are moved from positions shown by continuous lines to positions shown by dot-dash lines, each supply passage width on the merchandise supply side changes from a width A1 to a width A2, while each outlet passage width on the side of the merchandise outlet end changes from a width B1 to a width B2.

Regarding the merchandise passage on the rear row side, as shown in FIG. 1(*c*), when a width of the outlet passage 9' is changed from the width B1 to the width B2 by moving the outlet regulating plate 8', the connecting rod 16 is inter-relatedly moved in its lower and upper portions in the opposite directions with a point 17 as a center so that the width of the passage on the merchandise supply portion side changes from A1 to A2. In other words, the outlet passage width B between the vending mechanism 7' and the outlet regulating plate 8' opposite thereto on the rear side thereof, and the passage width A between the top tray 5' and the vending segment 3, are concurrently increased or decreased corresponding to a large can or a small can of a merchandise to be sold.

In the above embodiment, the fixing positions of the outlet regulating plates 8, 8' are moved by hand, but when the top trays 5, 5' are moved by hand in a lateral direction, the outlet regulating plates 8, 8' are moved inter-relatedly thereto through the connecting rods 15 and 16, as in the former case. Namely, when either one of the top trays 5, 5' or the outlet regulating plates 8, 8' is moved by hand, the other member is also moved inter-relatedly thereto. Therefore, when a merchandise to be sold is changed from a large can to a small can, or from a small can to a large can, it is not necessary to separately adjust the top trays 5, 5' and the outlet regulating plates 8, 8', and the top trays 5, 5' and the outlet regulating plates 8, 8' can be concurrently set to new setting positions through an adjusting operation from one position.

Figure 2A:
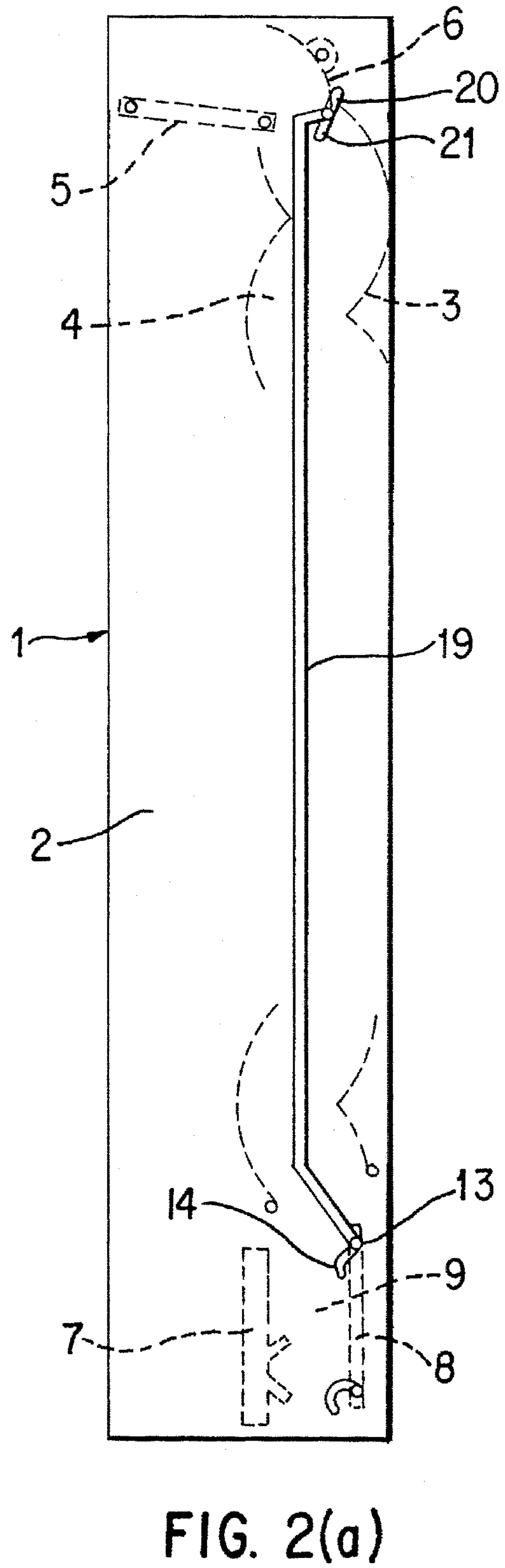
FIG. 2(*a*) is a side view of a vending rack of a second embodiment.
Figure 2B:
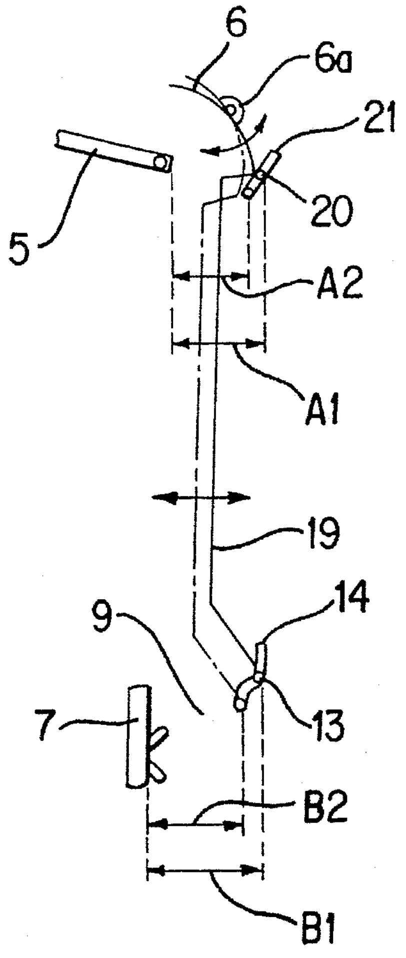

FIGS. 2(*a*) and 2(*b*) show a second embodiment of the present invention. In the embodiment, a top tray 5 is fixed at a set position, and a swingable merchandise supply guide 6 in a curved shape arranged in the rear side of the top tray 5 and a lower end portion of an outlet regulating plate 8 are connected by a connecting rod 19 and a through pin 20 to each other. The through pin 20 is engaged in and guided by a regulating groove 21 in a vertically oblique direction formed on a rack side wall 2. The center of the guide 6 is swingably suspended between the rack side walls through a through pin 6*a*.

In the structure as described above, when a passage width of the outlet passage 9 is changed from B1 to B2 by moving by hand the outlet regulating plate 8 in a lateral direction along a regulating groove 14, the connecting rod 19 is moved inter-relatedly thereto from a position shown by a solid line to a position shown by a dot-dash line as shown in FIG. 2(*b*). At the same time, a merchandise supply guide 6 provided at an upper end of the connecting rod 19 is moved or inclined from a position shown by a solid line to a position shown by a dot-dash line along the regulating groove 21 around the through pin 6*a* as a supporting point, so that a passage width between the rear end of the top tray 5 fixed at a certain position and the guide 6 is changed from A1 to A2.

Accordingly, as in the first embodiment described above, when a can to be sold with a certain diameter is changed to another diameter can, the fixing position of the outlet regulating plate 8 is moved to a position where an outlet passage width coincides with a diameter of the can to be sold. Thus, the passage width at a side of the merchandise supply portion is concurrently adjusted inter-relatedly to the movement.

Figure 3A:
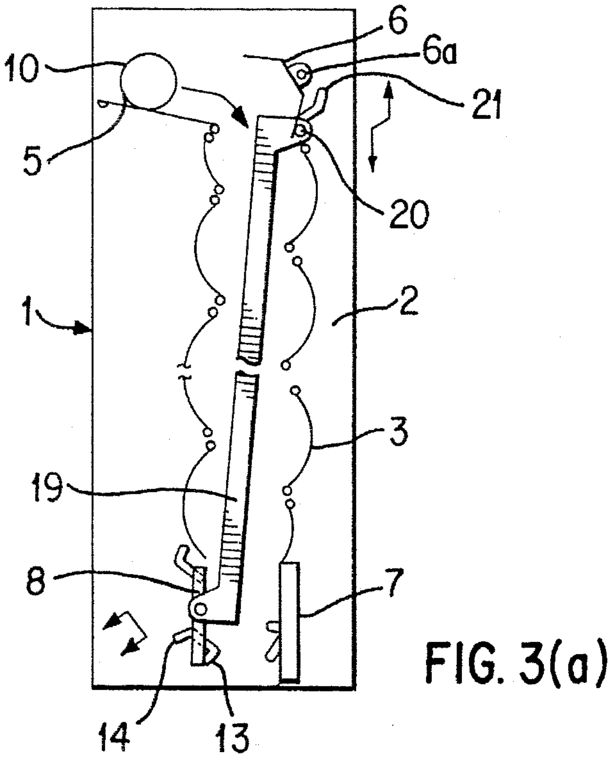
FIG. 3(*a*) is a side view of a vending rack of a third embodiment.
Figure 3B:
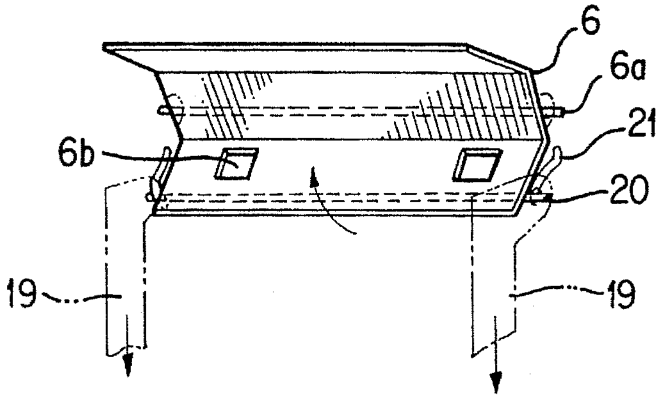
Figure 3C:
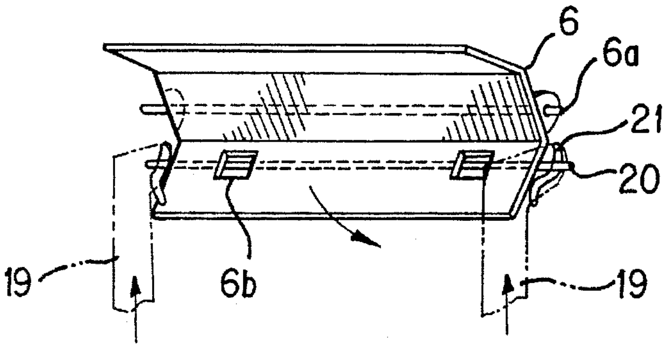
Figure 4A:
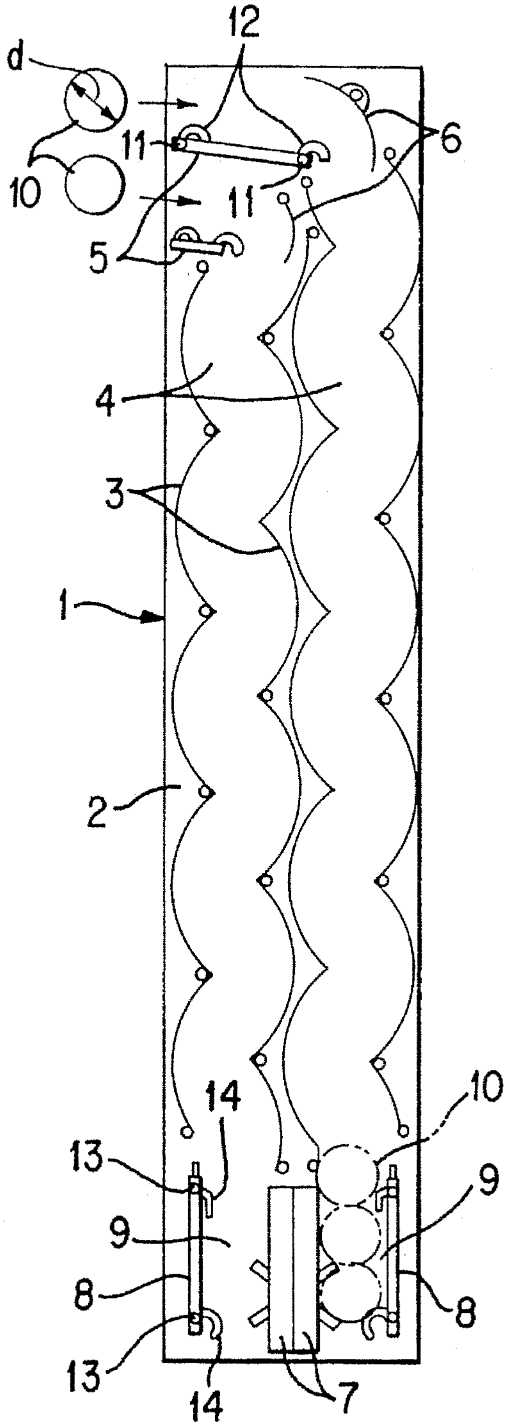
FIG. 4(a) PRIOR ART
FIG. 4(*a*) is a side view of an interior of a conventional serpentine vending rack.
Figure 4B:
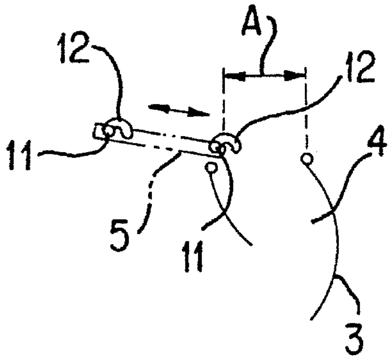
FIG. 4(b) PRIOR ART
Figure 4C:
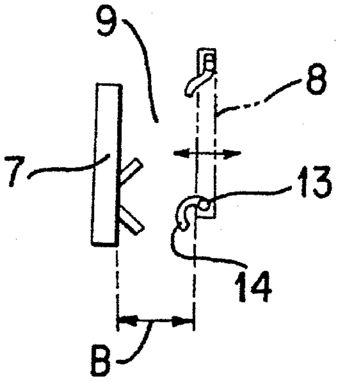
FIG. 4(c) PRIOR ART

FIGS. 3(*a*), 3(*b*) and 3(*c*) show a modified embodiment of the second embodiment of the present invention. In the embodiment, a connecting rod 19 fixed to an outlet regulating plate 8 at its lower end is not connected to a merchandise supply guide 6 at its upper end, but a through pin 20 is coupled to an upper portion of the connection rod 19 and is guided in a regulating groove 21 in a vertically oblique direction. The through pin 20 abuts against a rear surface of a merchandise supply guide 6 under a through pin 6*a* for swinging therefor. Further, inspection windows 6*b* are provided on both sides of a lower portion of a plate of the merchandise supply guide 6.

In the structure as described above, when the outlet regulating plate 8 is transferred to a set position corresponding to a small diameter can, the connecting rod 19 is moved downward as shown in FIG. 3(*b*), and in cooperation therewith, the through pin 20 projects forwardly while descending along the regulating groove 21. On the other hand, when the outlet regulating plate 8 is transferred from the set position to a set position corresponding to a large diameter can, the connecting rod 19 is moved upward as shown in FIG. 3(*c*), and in cooperation therewith, the through pin 20 retreats while ascending along the regulating groove 21. Therefore, in correspondence with the lateral movement of the through pin 20, an opening angle of the merchandise supply guide 6 is regulated in a lateral direction around the through pin 6*a*.

Thus, similarly as described in FIG. 2(*b*), when the outlet regulating plate 8 is laterally transferred by hand along the regulating groove 14 so that the passage width of the outlet passage 9 is changed from B1 to B2, in cooperation with the movement, a passage width between the merchandise supply guide 6 and a rear end of the top tray 5 fixed at a stationary position is shifted from A1 to A2 (refer to FIG. 2(*b*)).

Also, the through pin 20 can be seen through the inspection windows 6*b* opened in the merchandise supply guide 6 according to a set position. More specifically, in the set position as shown in FIG. 3(*b*), the through pin 20 does not appear in the inspection windows 6*b* since the through pin 20 is hidden behind the merchandise supply guide 6. On the contrary, in the set position as shown in FIG. 3(*c*), the through pin 20 appears in the inspection windows 6*b*. Therefore, after the outlet regulating plate 8 is changed and set to another position, the inspection windows 6*b* of the merchandise supply guide 6 located inside the rack are inspected from the front position of the merchandise rack 1 through a merchandise supply port. Thus, it is possible to confirm whether the change and setting of the passage width regulating mechanism has been carried out correctly.

Moreover, since the connecting rod 19 and the merchandise supply guide 6 are not connected directly, when comparing the second embodiment, an adjusting operation can be carried out more lightly and smoothly. Also, it is possible to prevent an unexpected switching of a set position by a vertical movement of the connecting rod 19 due to impact force caused by a collision of a supplied merchandise and the merchandise supply guide 6 at the time of supplying the merchandise.

As described hereinabove, when the merchandise to be sold through a serpentine-type vending rack is changed from a large diameter can to a small diameter can, or from a small diameter can to a large diameter can, in the prior structure, the top tray and the outlet regulating plate are separately adjusted on the merchandise supply side and the merchandise outlet side. However, in the present invention, the merchandise passage widths on the merchandise supply side and merchandise outlet side are concurrently and inter-relatedly changed and set by one adjusting operation. Therefore, according to the structure of the present invention, the adjusting operation can be carried out more simply, and adjusting errors can be prevented more effectively, when compared with the prior structure.

What is claimed is:

1. A vending rack for a vending machine comprising, a housing having a plurality of grooves, a path for a merchandise defined in the housing and having an inlet side and an outlet side, an inlet regulating device situated at the inlet side of the path for regulating a size of the merchandise to be supplied to the path, a vending mechanism situated near the outlet side of the path, an outlet regulating plate situated at the outlet side of the path, a position of the outlet regulating plate being adjusted according to the size of the merchandise, and a connecting rod situated between the inlet regulating device and the outlet regulating plate and having a plurality of pins engaging the grooves of the housing, said connecting rod being attached to the housing and moved along the grooves so that when one of the inlet regulating device and the outlet regulating plate is moved to adjust the size of the merchandise, the other of the inlet regulating device and the outlet regulating plate is moved to thereby adjust the inlet regulating device and the outlet regulating plate in one adjustment.

2. A vending rack according to claim 1, wherein said inlet regulating device is a top tray to be moved in the housing.

3. A vending rack according to claim 2, wherein said connecting rod further includes a supporting pin in a middle of the connecting rod, and said housing further includes a vertical supporting groove, said supporting pin engaging the supporting groove so that both ends of the connecting rod rotate in opposite directions around the supporting pin when adjusting the inlet regulating device and the outlet regulating plate.

4. A vending rack according to claim 1, further comprising a top tray fixed in the housing, said inlet regulating device being a guide plate pivotally attached to the housing behind the top tray.

5. A vending rack according to claim 4, wherein said connecting rod is pivotally connected to the guide plate to adjust an angle of the guide plate.

6. A vending rack according to claim 4, wherein said housing further includes a regulating groove, and said connecting rod further includes a through pin engaging the regulating groove, said through pin being located behind the guide plate and supporting the same for adjust an angle of the guide plate.

7. A vending rack according to claim 6, wherein said guide plate includes at least one opening for inspecting a location of the through pin.

* * * * *